Patented May 14, 1940

2,200,763

UNITED STATES PATENT OFFICE 2,200,763

PRODUCTION OF ALDEHYDE-AROMATIC HYDROCARBON RESINS

George K. Anderson and Edward A. Taylor, Pittsburgh, and John B. Fishel, Oakmont, Pa., assignors to The Neville Company, Pittsburgh, Pa., a corporation of Pennsylvania No Drawing. Application June 29, 1938, Serial No. 216,468

3 Claims. (Cl. 260—67)

This invention relates to hydrocarbon resins produced by polymerization of the condensation product of an aldehyde and an aromatic hydrocarbon.

The condensation of aromatic hydrocarbons with aldehydes, as well as the production of resins by polymerization of the product, has been known for many years, and much work has been done along these lines. The classical catalyst, and that generally used, which serves both as a condensing agent and as polymerizing stimulus, is concentrated (66° Bé.) sulfuric acid. Its use for simple condensation purposes may be unobjectionable, but in effecting polymerization disadvantageous results appear which militate against its successful use in the commercial production of resins of this class. For instance, the use of ordinary concentrated sulfuric acid is generally accompanied by the formation of varying amounts of insoluble and infusible resins, which is objectionable because for many of the more important uses of these resins the quality of solubility is essential. Similarly, the infusibility of the resin precludes its use for some purposes.

In general these reactions are effected at moderately elevated temperatures, say 60° to 180° C., which favors side reactions, such as oxidation and sulfonation, caused by the sulfuric acid. Not only do these undesired reactions reduce the resin yields, but also they tend to cause the resin to be of a dark color and consequently of depreciated commercial value. The use of ordinary concentrated sulfuric acid is objectionable also because the resin as recovered carries small amounts of acid which must be removed by treatment with alkali. Commonly the procedure is to extract the reaction mixture with an aromatic solvent, such as xylol, and then neutralize the solution with an aqueous solution of caustic soda. Due to the presence of dissolved and dispersed high molecular weight products and sulfonated compounds, highly stable emulsions are formed which can be broken only by prolonged heating at, for instance, 90° to 95° C. The finished resin always contains some dispersed salts and alkali, which is objectionable, and some amount of resin may be lost through imperfect resolution of the emulsion into its component parts.

All of these factors increase the cost of the resin. Costs are further increased because large volumes of solvent may be necessary in extracting the resin from the reaction mixture (as much as 9 volumes of xylol may be required to effect extraction) and the distillation of such large excess of solvent is an additional unproductive expense.

These undesirable consequences arise, as noted, from the tendency of ordinary concentrated sulfuric acid to cause oxidation and sulfonation, either or both, of the reaction ingredients or their products. It might be thought that these side reactions might be repressed by dilution of the acid with water, but this is not the case because water-diluted sulfuric acid will not satisfactorily effect the desired resin-forming reactions.

It is among the objects of the invention to provide a method of making hydrocarbon resins of the type to which reference has been made which is simple, easily performed, and readily controlled, and in which the disadvantages heretofore encountered in the use of concentrated sulfuric acid are repressed or eliminated.

The invention is predicated upon our discovery that the condensation of an aldehyde and an aromatic hydrocarbon with polymerization of the product may be effected satisfactorily and without the disadvantages attendant upon the use of ordinary concentrated sulfuric acid, by subjecting the reaction mixture to the condensation and polymerization stimulus of a modified sulfuric acid catalyst which has substantially less oxidizing and sulfonating effect upon the reaction mixture and its products than ordinary unmodified sulfuric acid, but whose efficacy in dehydrating and polymerizing is unimpaired. We have found that by the use of such a catalyst there are obtained satisfactory yields of light colored resins, the production of insoluble polymers is minimized, and no appreciable oxidation or sulfonation, with their attendant disadvantages, occurs. Moreover, the resin may be separated more readily, quickly and cheaply from the spent catalyst than from the residue of ordinary concentrated sulfuric acid, and the entire procedure is simplified, shortened and cheapened.

The invention is applicable generally to aldehydes and aromatic hydrocarbons. For instance, there may be used formaldehyde, acetaldehyde, and other aliphatic aldehydes, which generally are preferred, although the various aromatic aldehydes, exemplified by benzaldehyde, may be used. This condensation is applicable, as far as we are aware, generally to aromatic hydrocarbons. By way of illustration and not of limitation, the aldehyde may be condensed with such widely varying aromatic hydrocarbons as benzene, toluene, xylene, naphthalene, phenanthrene, acenaphthene, mesitylene, diphenyl, and many others. Not only is it applicable to the pure hydrocarbons, but also to mixtures of hydrocarbons.

The applicability of the reaction to such mixtures is exemplified by the condensation of solvent naphthas which have been freed, or substantially freed, from unsaturated bodies and which consist chiefly of homologs of benzene, and by the condensation of the heavy oils resulting from the polymerization of such hydrocarbons as indene and which largely comprise the dimers and the trimers with perhaps some indene monomer.

The resins produced by the invention are characterized, in general, by possessing thermoplastic properties, by stability to heat up to temperatures at which they crack or decompose, by solubility in hydrocarbon solvents, and by insolubility in alcohols. Also, as noted, the practice of the invention yields light colored resins. Such materials are desirable commercially for a wide variety of uses which will be recognized by those skilled in the art.

Because of its availability and the ease with which the condensation is effected, it is preferred for most purposes to use formaldehyde which produces, as known, diaryl methanes. The use of formalin is undesirable because the large amount of water requires an excessive amount of dehydrating agent. We have found that trioxymethylene, or paraformaldehyde, is entirely satisfactory.

A variety of modified sulfuric acid catalysts suitable for use in the practice of the invention are available. We have found, for instance, that, strikingly enough, adsorption of concentrated sulfuric acid on activated clay so modifies the properties of the acid as to satisfactorily reduce the oxidizing and sulfonating properties without adversely affecting the condensing and polymerizing properties. Such a catalyst may be made readily by mixing ordinary 66° sulfuric acid with activated clay in amounts sufficient to form a paste which is added directly to the reaction mixture.

Modified sulfuric acid catalysts falling within the scope of the invention may be produced also by dilution of the acid with an organic solvent in which it is soluble and which is inert toward the acid and the reactants. A variety of such solvents, exemplified by ethyl acetate and the alkyl ethers, are available. Of the aliphatic ethers, the most suitable are those from diethyl to diamyl ether, and we have found isopropyl ether to be particularly suited to the purposes of the invention.

Although the exact proportions in which the acid and diluent, such as ether, are mixed are not critical, as long as enough diluent is present to repress oxidation and sulfonation, the best results are had by using an excess of diluent, although the use of too great an excess imports the cost of distillation after the reaction has been completed. As an example, we have found that in the case of isopropyl ether a suitable proportion is from 4 to 5 volumes of ether per volume of acid. Such ether-acid mixtures should preferably be used before they have stood for any great length of time.

While we do not bind ourselves to this theory, we now believe that when the sulfuric acid is diluted with ether the two react to form some amount of an alkyl sulfuric acid catalyst which serves to initiate the reactions, and that this reaction between the ether and acid progresses, to form further amounts of catalyst, under the heat used in the condensation and polymerization. Be this as it may, we have found that an alkyl sulfuric acid catalyst produced by intentional reaction of ether and acid, such as an alkyl acid sulfate, may be used satisfactorily in the practice of the invention and with advantage, economically, as compared with simple mixtures of ether and acid such as those to which reference has just been made. For this purpose we prefer to use the saturated aliphatic ethers described hereinabove, especially diethyl ether, and particularly isopropyl ether. In practicing this embodiment of the invention the ether and acid are mixed in suitable proportions and then heated gently, say at 50° to 75° C., most suitably at 50° to 60° C., for a sufficient period of time to cause the reaction to reach equilibrium with production of alkyl sulfuric acid catalyst.

For most purposes there should be used at least 1 mol, and preferably more than 1 mol, of acid for each mol of ether, and we believe that in general it is desirable to use up to about 2 mols of acid for each mol of ether, although for reasons of economy it is preferred to use not more than slightly in excess of the latter proportions. The reason for this is that there is an increase in utilization of ether to form stable alkyl sulfuric acid compound as the excess of sulfuric acid is increased up to 1 mol of acid per ½ mol of ether, or slightly less, say 0.493 mol of ether.

In the practice of the invention the aldehyde and hydrocarbon are mixed, the catalyst is added, and the reaction is then carried out. The mixture should be agitated vigorously during the reaction. Moderately elevated temperatures are generally necessary, but the precise temperature will depend, at least in part, upon the particular catalyst, aldehyde and hydrocarbon involved, and upon the character, e. g., the melting point, desired in the resin. Hence specific temperature limits can not be given for all possible conditions, but the temperature should be high enough to cause the reactions to go on satisfactorily, and low enough to avoid cracking of the resin. It may be stated, however, that as low temperatures as possible should be used to avoid undesirable darkening of the resin. As an example, using formaldehyde temperatures of about 90° to 135° C. suffice for many purposes. When the reaction has reached completion the resin may be recovered in simple manner by various procedures some of which are exemplified in the examples presently to be given.

The proportions in which the aldehyde and hydrocarbon are reacted are likewise dependent upon the properties desired in the resulting resin. Generally speaking, however, the yield of resin and its hardness improve as the proportion of aldehyde increases. We believe that for most purposes the use of 1 to 2 mols of aldehyde, such as formaldehyde, per mol of aromatic hydrocarbon affords satisfactory results.

The following examples are illustrative of the invention and its benefits.

In one test formaldehyde, in the form of trioxymethylene, was condensed with solvent naphtha originating in the by-product coking of coal and from which the unsaturated bodies had been previously removed. This naphtha fraction boiled between 159° and 190° C., had a specific gravity of 0.864 at 15.5/15.5° C., and contained 88 per cent by volume of aromatic hydrocarbons. 375 grams of the naphtha were mixed with 75 grams of trioxymethylene and placed in a reaction vessel provided with a stirrer and a reflux condenser adapted to prevent the return of condensed water to the vessel. There was then added a modified sulfuric acid catalyst made by dissolving 10.2 ml. of 66° sulfuric acid in 40.8 ml. of ethyl acetate, the mixture being cooled during this operation. The catalyst was added slowly to the reaction mixture, which caused the reaction mixture to rise in temperature from 24° to 30° C. Heat was then applied and the mixture maintained four hours at 100° to 125° C. under reflux and with continuous agitation. There was then added an equal weight of petroleum benzine, which caused the formation of two layers, the upper layer being a solution of the resin in the petroleum benzine, and the lower layer the spent catalyst. The lower layer was drained off. There were added to the petroleum benzine layer 21.5 grams of Attapulgus clay, and the mixture was heated for fifteen minutes at 95° to 100° C. This treatment with activated clay removed the last traces of catalyst from the resin solution. The solution was filtered, which took place easily, and the petroleum benzine was distilled off from the filtrate at atmospheric pressure. The residual solution was then steam distilled six hours, producing 239.6 grams of resin of about 50° C. melting point, and having a color of 2 on the Neville Company color scale. A 20 per cent by weight solution of this resin in Stoddard naphtha was stable below 15° C. The distillate comprised 74 grams of heavy oil composed, presumably, largely of the lower, oily polymers.

In another test 300 cc. of the solvent naphtha used in the preceding test were heated to 80° C. in a reaction vessel as before, and the catalyst, made by mixing 12.2 ml. of 66° sulfuric acid with 22.4 grams of Superfiltrol activated clay to form a paste, was added. 28.4 grams of trioxymethylene were then added in portions, with stirring, over a twenty-minute interval. The first additions caused a drop in temperature, but the later additions caused the temperature to rise to a maximum of 125° C. The mix was then cooled back to 80° C., after which it was heated thirty minutes at 105° to 110° C. The total reaction time was one hour. There were then added 750 cc. of xylol, the mixture was heated to 80° C. and then filtered to separate the filtrate from the activated clay. 3 per cent by weight of Attapulgus clay was added to the filtrate, which was then heated and filtered, and the filtrate distilled, all as in the preceding example. There were obtained 70 grams of a resin having a melting point of 90° C. In the distillation a crystalline solid of unknown composition appeared in the condenser.

In yet another test the catalyst was made by mixing 17.2 grams of 66° sulfuric acid and 27 grams of isopropyl ether. This catalyst was added in batches during a five-minute interval to a mixture of 319 grams of xylol (industrial grade) and 42.5 grams of trioxymethylene in a reaction vessel like that described above, the mixture being stirred continuously up to the end of the reaction. The first addition caused the temperature to rise from 20° to 26° C., but there was no further temperature increase, showing the excellent manner in which the character of the sulfuric acid has been modified. When all of the catalyst had been added the contents of the vessel were heated three hours at 100° to 140° C. and then treated, by adding an equal weight of petroleum benzine, separating the acid layer, adding 21.5 grams of Attapulgus clay to the resin solution, heating thirty minutes at 95° to 100° C., filtering, and treating the filtrate as in the first example. There resulted 122.5 grams of resin of 78° C. melting point and a color of 3. A 20 per cent by weight solution of this resin in Stoddard naphtha was stable below 15° C. The distillate comprised 73.7 grams of heavy oil.

As further exemplifying the applicability of the invention, a catalyst made by adding 6.6 ml. of 66° sulfuric acid to 26.4 ml. of isopropyl ether was added slowly to 197.1 grams of naphthalene (79°–80° C. M. P.), 46.2 grams of trioxymethylene, and 102.9 grams of petroleum benzine as a diluent contained in a reaction vessel as in the preceding examples. No temperature rise occurred during the addition of the catalyst. The contents of the vessel were heated and agitated for a total period of five hours during which time the contents were at 100° to 112° C. for four hours. The resin was recovered by adding an equal weight of petroleum benzine and 64.5 grams of activated clay, and heating to 95° to 102° C. for thirty minutes. The resin was extracted with xylol at 100° to 108° C. After filtering from the clay the filtrate was distilled as before, producing 158.2 grams of dinaphthylmethane resin of 116° C. melting point and a color of 2.5. The distillate comprised 9.4 grams of heavy oil and 20 grams of unreacted naphthalene.

In another test a catalyst was prepared by adding 80 gallons of sulfuric acid (66° acid) slowly to 106 gallons of isopropyl ether. The mixture was stirred and was kept below 40° C. The temperature was then raised to 50° to 60° C. and held in this range for three hours and then cooled to room temperature. There was used in this test a high flash naphtha boiling at 160° to 185° C. and having a specific gravity of 0.875 at 15.5/15.5° C. To 240 grams of this naphtha and 60 grams of trioxymethylene contained in a reaction vessel as described above there were added 22 grams of the foregoing catalyst. The mixture was heated three hours at 90° to 100° C. It was then diluted with 500 cc. of Stoddard naphtha and 16 grams each of Attapulgus clay and of Superfiltrol clay were added, the mixture being then heated one hour at 110° C., followed by filtration. The naphtha was distilled from the filtrate at room temperature. The residue was steam distilled two hours at 250° C., producing a distillate oil which solidified on cooling, and 108 grams of resin of 96° C. melting point, and of 4 color.

In yet another test there were used 232 grams of "Nevinol," 120 grams of the solvent naphtha used in the first example, and 15 grams of trioxymethylene. The catalyst was a mixture of 18.4 grams of 66° sulfuric acid and 29 grams of isopropyl ether. The catalyst was added slowly, with stirring, to the mixture in a container as before, with a total temperature rise of but 34° C. The mixture was then heated four hours and thirty-five minutes at 100° to 150° C., and was then treated in the manner of the first example. This produced 191.9 grams of a soft resin of about 10° C. M. P., and with a color of 4. The heavy oil appeared to be unreacted "Nevinol," which is a product sold by The Neville Company, Pittsburgh, Pa. It is a heavy oil obtained in the polymerization of the unsaturates in crude solvent naphtha, and it is composed largely of the dimers and trimers of coumarone and of indene.

According to the provisions of the patent statutes, we have explained the principle of our invention and have described what we now consider to represent its best embodiment. However, we desire to have it understood that, within the scope of the appended claims, the invention may be practiced otherwise than as specifically described.

We claim:

1. That method of making resin which comprises subjecting a mixture of an aldehyde and an aromatic hydrocarbon to the influence of a modified sulfuric acid catalyst comprising concentrated sulfuric acid adsorbed on activated clay, and to a temperature productive of condensation of said aldehyde and hydrocarbon, and recovering polymerized condensation product of said aldehyde and hydrocarbon.

2. A method according to claim 1, said aldehyde being formaldehyde.

3. A method according to claim 1, said aldehyde being formaldehyde, and said hydrocarbon being naphthalene.

GEORGE K. ANDERSON.
EDWARD A. TAYLOR.
JOHN B. FISHEL.